United States Patent
Peng et al.

(10) Patent No.: US 11,867,109 B2
(45) Date of Patent: Jan. 9, 2024

(54) CATALYST LAYER FORMING MATERIAL, CATALYST APPARATUS CONSTITUENT MATERIAL, CATALYST APPARATUS, AND METHODS FOR MANUFACTURING THE SAME

(71) Applicant: Sakura Kogyo Co., LTD, Hamamatsu (JP)

(72) Inventors: Hou Peng, Hamamatsu (JP); Kazuhiro Nishihara, Hamamatsu (JP); Shoichi Uchiyama, Hamamatsu (JP); Hiromi Suzuki, Hamamatsu (JP); Miho Yamashita, Hamamatsu (JP)

(73) Assignee: Sakura Kogyo Co., LTD., Hamamatsu (JP)

( * ) Notice: Subject to any disclaimer, the term of this patent is extended or adjusted under 35 U.S.C. 154(b) by 136 days.

(21) Appl. No.: 17/252,040

(22) PCT Filed: Feb. 7, 2020

(86) PCT No.: PCT/JP2020/004923
§ 371 (c)(1),
(2) Date: Dec. 14, 2020

(87) PCT Pub. No.: WO2020/195237
PCT Pub. Date: Oct. 1, 2020

(65) Prior Publication Data
US 2021/0262373 A1 Aug. 26, 2021

(30) Foreign Application Priority Data
Mar. 26, 2019 (JP) .................. 2019-058244

(51) Int. Cl.
| | | |
|---|---|---|
| *F01N 3/28* | (2006.01) | |
| *B01J 35/04* | (2006.01) | |
| *B01J 37/08* | (2006.01) | |
| *B01J 3/00* | (2006.01) | |
| *B01J 37/04* | (2006.01) | |
| *B01J 37/00* | (2006.01) | |
| *B82Y 30/00* | (2011.01) | |
| *B82Y 40/00* | (2011.01) | |

(52) U.S. Cl.
CPC ............ *F01N 3/2828* (2013.01); *B01J 35/04* (2013.01); *B01J 37/0045* (2013.01); *B01J 37/04* (2013.01); *B01J 37/08* (2013.01); *F01N 3/2807* (2013.01); *F01N 3/2835* (2013.01); *B82Y 30/00* (2013.01); *B82Y 40/00* (2013.01)

(58) Field of Classification Search
CPC .... F01N 3/2828; F01N 3/2807; F01N 3/2835; B01J 35/04; B01J 37/0045; B01J 37/04; B01J 37/08
See application file for complete search history.

(56) References Cited

U.S. PATENT DOCUMENTS

| | | | |
|---|---|---|---|
| 2006/0075731 A1* | 4/2006 | Ohno | ........................ B01J 23/63 55/523 |
| 2011/0212007 A1 | 9/2011 | Lu et al. | |
| 2018/0104679 A1* | 4/2018 | Suzuki | ................. B01J 37/0018 |

FOREIGN PATENT DOCUMENTS

| | | |
|---|---|---|
| EP | 3275542 A1 | 1/2018 |
| JP | H-07256116 A | 10/1995 |
| JP | 2005-87826 A | 4/2005 |
| JP | 2009000663 A | 1/2009 |
| JP | 2013-180235 A | 9/2013 |
| JP | 2014-227324 A | 12/2014 |
| JP | 2016-185492 A | 10/2016 |
| JP | 2018-153794 A | 10/2018 |

OTHER PUBLICATIONS

Japan Science and Technology Agency Report No. 775 entitled Succeeded in Developing an Exhaust Gas Purification Device That Applies Papermaking Technology-Purification With Half the Precious Metal Catalyst As Before, dated Nov. 10, 2010 (11 pages).
International Search Report (ISR) for PCT/JP2020/004923 dated Apr. 14, 2020 (5 pages).
Extended European Search (EESR) Report for EP Pat. No. 20779804 dated May 10, 2021 (8 pages).
English translation of International Preliminary Report on Patentability for PCT/JP20201004923 dated Nov. 5, 2020 (5 pages).

* cited by examiner

*Primary Examiner* — Yong L Chu
(74) *Attorney, Agent, or Firm* — Shumaker, Loop & Kendrick, LLP

(57) ABSTRACT

A novel catalyst constituent material for combustion gas purification, which has an extremely good ratio of contact between each catalyst metal particle and an exhaust gas; and a catalyst device which uses this catalyst constituent material for combustion gas purification; and a method for producing this catalyst constituent material for combustion gas purification. The catalyst constituent obtained by mixing catalyst metal particles and a pore-forming material that disappears at high temperatures into a catalyst supporting material, which is a slurry containing fine ceramic particle. The pore-forming material also contains long fibers of cellulose nanofibers and/or short fibers of cellulose nanofibers.

10 Claims, 5 Drawing Sheets

CATALYST LAYER FORMING MATERIAL, CATALYST APPARATUS CONSTITUENT MATERIAL, CATALYST APPARATUS, AND METHODS FOR MANUFACTURING THE SAME

TECHNICAL FIELD

The present invention relates to a catalyst apparatus provided to clean the exhaust gas or any other substance from a motorcycle, an automobile, or any other vehicle and a constituent material of the catalyst apparatus.

BACKGROUND ART

A catalyst apparatus used to process exhaust gas or any other substance from a motorcycle, an automobile, or any other vehicle is primarily formed of a catalyst element in which a carrier having a honeycomb structure carries catalyst metal particles to greatly increase contact between the catalyst apparatus and the exhaust gas.

To produce such a catalyst element, an approach of coating a honeycomb column made of stainless steel or a ceramic material with the catalyst metal particles along with the catalyst carrier (see Patent Literature 1, for example) is employed.

The catalyst metal described above, which is a noble metal, such as platinum, rhodium, and palladium, has a challenge of reduction in the amount of required catalyst metal through efficient contact between the catalyst metal and the exhaust gas.

An example of an attempt to reduce the amount of required catalyst metal may be an approach that causes a material primarily made of ceramic powder or pulp to undergo a papermaking process to form a porous paper-based sheet, molds the paper-based sheet into a corrugate shape, winds the corrugate paper-based sheet to form a honeycomb column, and then coats the honeycomb column with a ceramic raw material and catalyst metal particles (see Non-Patent Literature 1, for example).

The approach described above, however, requires the steps of beating the raw material, making paper, and drying the final product and therefore disadvantageously increases the manufacturing cost.

CITATION LIST

Patent Literature

Patent Literature 1: Japanese Patent Laid-Open No. 2005-87826
Non Patent Literature 1: Japan Science and Technology Agency Report No. 775

SUMMARY OF INVENTION

Technical Problem

The present invention proposes an approach that is a result of essential reexamination of the approach of the related art as above and is directed to a technical challenge of development of a novel catalyst layer forming material, a catalyst apparatus constituent material, and a catalyst apparatus that allow increased contact between individual catalyst metal particles and the exhaust gas or any other substance, and further to methods for manufacturing the catalyst layer forming material, the catalyst apparatus constituent material, and the catalyst apparatus.

Solution to Problem

That is, in one aspect, a catalyst layer forming material described herein contains a catalyst carrier, which is slurry containing ceramic fine particles, mixed with catalyst metal particles and a pore former to be evaporated at high temperature, and the pore former contains long fibers formed of cellulose nano-fibers and/or short fibers formed of cellulose nano-fibers.

In some aspects, the catalyst apparatus constituent material described herein contains the catalyst layer forming material. The catalyst layer forming material is applied onto a surface of a base or a surface of a catalyst-metal-particle-containing layer formed on the surface of the base to form a catalyst layer, and the catalyst layer forming material is baked so that the pore former is evaporated to form pores.

In some aspects, the catalyst layer is formed of a plurality of catalyst layers.

In some aspects, the base is a metal foil, and the base is formed in a corrugate shape and lapped and wound into a tubular shape having a honeycomb cross section.

In some aspects, the base is a honeycomb structure made of ceramic.

In one aspect, the catalyst apparatus includes the catalyst apparatus constituent material having a base is a honeycomb structure made of ceramic accommodated in a casing. In one aspect, the catalyst apparatus includes the catalyst apparatus constituent material having the base is a metal foil, and the base is formed in a corrugate shape and lapped and wound into a tubular shape having a honeycomb cross section accommodated in a casing.

In one aspect, a method for manufacturing a catalyst layer forming material is described herein, the method includes mixing a catalyst carrier, which is slurry containing ceramic fine particles, with catalyst metal particles and a pore former to be evaporated at high temperature, and the pore former contains long fibers formed of cellulose nano-fibers and/or short fibers formed of cellulose nano-fibers.

In one aspect, the method includes applying the catalyst layer forming material manufactured by the method for manufacturing a catalyst layer forming material onto a surface of a base, and baking the catalyst layer forming material to evaporate the pore former to form pores.

In one aspect, the catalyst layer is formed of a plurality of catalyst layers.

In one aspect, the base is formed in a corrugate shape and lapped and wound into a tubular shape having a honeycomb cross section.

In one aspect, the base is a honeycomb structure made of ceramic.

In one aspect, a method for manufacturing a catalyst includes accommodating the catalyst apparatus constituent material manufactured by the method for manufacturing a catalyst apparatus constituent material.

The challenge described above is achieved based on the invention described herein.

Advantageous Effects of Invention

First, catalyst layer forming material and method described herein in which the long fibers made of cellulose nano-fibers and the short fibers made of cellulose nano-fibers are uniformly dispersed in the slurry, allows uniform distribution of the pores formed in the catalyst layer and formation of a pore network after the catalyst layer forming material is baked.

The catalyst layer forming material and method described herein allows uniform distribution of the pores in the catalyst layer and easy formation of the components of the catalyst apparatus in each of which the pore network formed of individual pores connected to each other are formed.

The long-dimension pores formed when the long fibers made of cellulose nano-fibers are evaporated can be connected to the short-dimension pores formed when the short fibers made of cellulose nano-fibers are evaporated to form a pore network.

The catalyst layer forming material and method described herein allows the pore networks formed in the plurality of formed catalyst layers to be connected to each other.

Further, the type of the catalyst metal particles present in the layers can differ from each other.

The catalyst layer forming material and method described herein can form the honeycomb structure that allows the exhaust gas or any other substance to access the individual catalyst metal particles uniformly distributed in the catalyst layer via the pore network.

The catalyst layer forming material and method described herein allows manufacture of a catalyst apparatus that further excels in durability without a decrease in contact between the individual catalyst metal particles and the exhaust gas while reducing the cost and other factors involved in the formation of the honeycomb structure.

The catalyst layer forming material and method described herein, in which the long fibers made of cellulose nano-fibers and the short fibers made of cellulose nano-fibers are uniformly dispersed in the slurry, allows uniform distribution of the pores formed in the catalyst layer and formation of a pore network after the catalyst layer forming material is baked.

The catalyst layer forming material and method described herein allows easy formation of the components of the catalyst apparatus in each of which the pores are uniformly distributed in the catalyst layer.

The long-dimension pores formed when the long fibers made of cellulose nano-fibers are evaporated can be connected to the short-dimension pores formed when the short fibers made of cellulose nano-fibers are evaporated to form a pore network.

The catalyst layer forming material and method described herein allows the pore networks formed in the plurality of formed catalyst layers to be connected to each other.

Further, the type of the catalyst metal particles present in the layers can differ from each other.

The catalyst layer forming material and method described herein allows formation of a honeycomb structure that allows access the uniformly distributed individual catalyst metal particles via the pore network.

The catalyst layer forming material and method described herein allows manufacture of a catalyst apparatus that further excels in durability without a decrease in contact between the individual catalyst metal particles and the exhaust gas while reducing the cost and other factors involved in the formation of the honeycomb structure.

DESCRIPTION OF EMBODIMENTS

Figure 1:
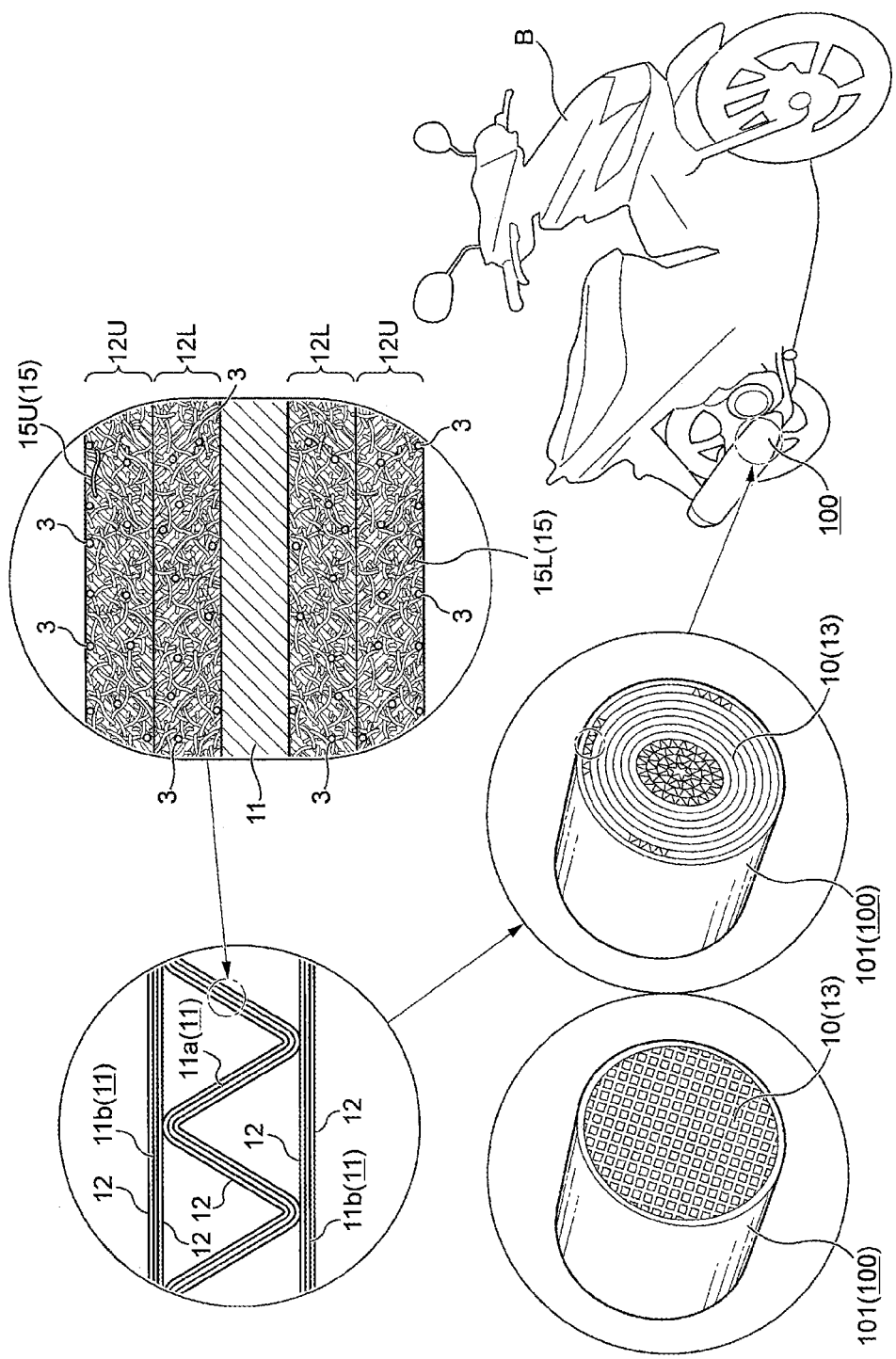
FIG. 1 is a perspective view showing a catalyst apparatus constituent material and a catalyst apparatus according to the present invention and a partial enlarged view of the catalyst apparatus constituent material.

The best mode of "a catalyst layer forming material, a catalyst apparatus constituent material, a catalyst apparatus, and methods for manufacturing the same" according to the present invention are described below, and the mode can be changed as appropriate to the extent that the changes falls within the technical idea of the present invention.

Embodiments

First, a catalyst layer forming material 1 according to the present invention is used to form a catalyst apparatus constituent material 10, which is a component of a catalyst apparatus 100, which is provided to clean the exhaust gas or any other substance from a motorcycle, an automobile, or any other vehicle, is a slurry substance containing catalyst metal particles 3, and is formed of a catalyst carrier 2 mixed with the catalyst metal particles 3 and a pore former 5, which is evaporated at high temperature.

The catalyst carrier 2 is slurry containing ceramic fine particles. The slurry may be further mixed, for example, with a metal oxide precursor.

The ceramic fine particles are made of $Al_2O_3$ (alumina), $SiO_2$ (silica), or any other substance ground into powder having predetermined particle diameter.

The metal oxide precursor is made of a material that forms a ceramic structure when undergoing a condensation reaction, such as alumina sol and silica sol.

The catalyst metal particles 3 are made of any one or more of Pt (platinum), Rh (rhodium), Pd (palladium), Ir (iridium), Os (osmium), Ru (ruthenium), or any other noble metal, Al (aluminum), Ce (cerium), Zr (zirconium) or any other base metal.

The pore former 5 is formed of long fibers 5L made of cellulose nano-fibers (hereinafter referred to as CNF) and/or short fibers 5S made of CNF.

The long fibers 5L and the short fibers 5S are produced by mechanical or chemical defibration.

Preferably, the long fibers 5L are ultrathin fibers produced by mechanical defibration, whereas the short fibers 5S are produced by chemical defibration.

More preferably, the short fibers 5S are produced by TEMPO oxidizing defibration.

A description will now be made of a method for manufacturing the catalyst layer forming material 1 according to the present invention, a method for manufacturing the catalyst apparatus constituent material 10 formed by using the catalyst layer forming material 1, and a method for manufacturing the catalyst apparatus 100 formed by using the catalyst apparatus constituent material 10.

[Preparation of Catalyst Layer Forming Material]

Figure 2:
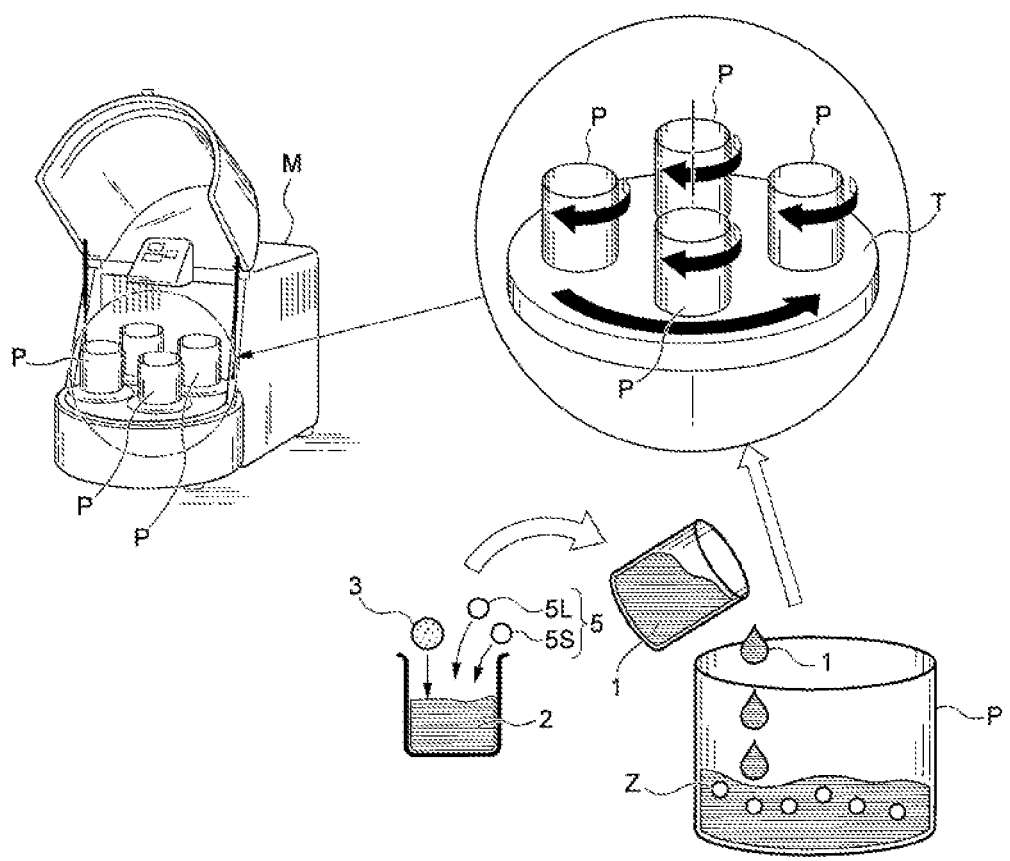
FIG. 2 is a perspective view showing steps of manufacturing a catalyst layer forming material according to the present invention.

To prepare the catalyst layer forming material 1, slurry that is the mixture of the catalyst carrier 2, the catalyst metal particles 3, and the pore former 5 (the long fibers 5L, the short fibers 5S) mixed with one another at a predetermined ratio is fed along with zirconia balls Z into a pot P by way of example and the mixture is thoroughly blended by using a planetary ball mill M including a turntable T, which rotates with the pot P while rotating around its axis, as shown in FIG. 2.

Using the planetary ball mill M allows not only collision between the zirconia balls Z and the inner wall of the pot P but larger centrifugal force produced by the two types of rotation in opposite directions, whereby submicron-level blending and stirring can be performed in a short period of time.

[Formation of Catalyst Apparatus Constituent Material]

The catalyst layer forming material 1 prepared as described above is then applied onto the surface of a base 11 to form a catalyst layer 12. The procedure of the formation of the catalyst layer 12 will be described below. The base 11 is preferably a metal foil made, for example, of stainless steel or aluminum having some degrees of flexibility, shape retainability, and heat resistance but can instead be made of another material having the properties described above.

(1) Formation of Honeycomb Structure

First, a corrugate base 11a having a corrugate shape having protrusions and recesses is formed by a corrugate controller (not shown). The corrugate base 11a having protrusions and recesses and flat liner bases 11b are then layered on each other, and the resultant structure is wound into a tubular shape. When a desired diameter of the tubular shape is achieved, the tube is cut into a cylindrical honeycomb structure 13 having a honeycomb cross section.

(2) Formation of Catalyst Layer

Figure 3:
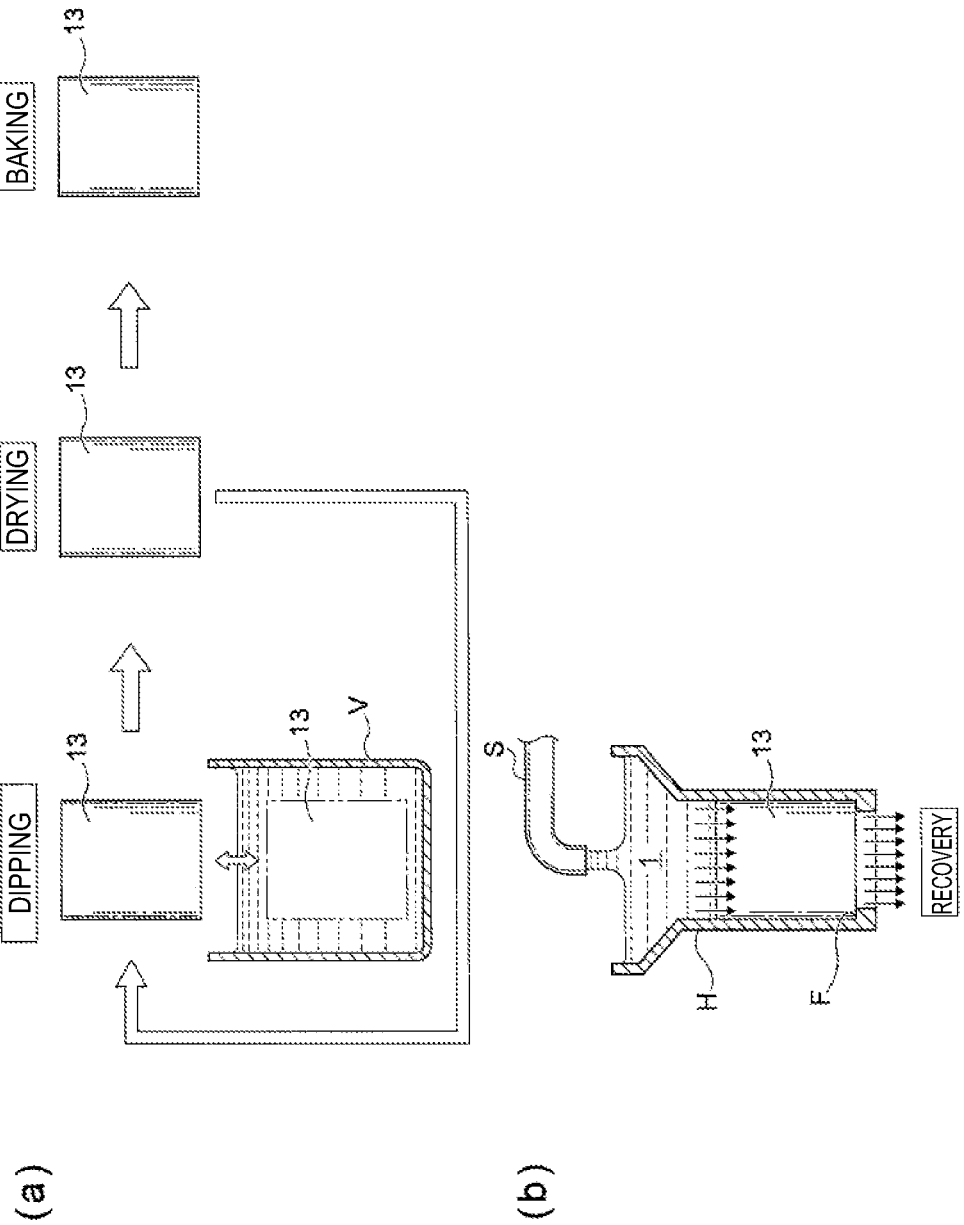
FIG. 3 is a side view showing the steps of manufacturing the catalyst apparatus constituent material according to the present invention.

The honeycomb structure 13 is then dipped in the catalyst layer forming material 1 fed into a liquid tank V so that the catalyst layer forming material 1 is applied onto the honeycomb inner wall surfaces, the honeycomb structure 13 is lifted, and an excess catalyst layer forming material 1 is then removed as appropriate, and the resultant honeycomb structure 13 is dried by a routine procedure to form the catalyst layer 12 on the inner wall surfaces, as shown in FIG. 3(a).

Repeating the dipping and drying described above allows the catalyst layer 12 to be stacked to a point where a desired thickness is achieved. In this process, the catalyst layer forming material 1 can be switched to a catalyst layer forming material 1 containing different catalyst metal particles 3 or any other substance, whereby catalyst layers 12 having different properties can be stacked to form.

In the embodiment, pores 15 are formed only in a lower catalyst layer 12L, which is formed on the base 11, but no pores 15 are formed in an upper catalyst layer 12U, as shown in FIG. 4(a). That is, the catalyst carrier 2, the catalyst metal particles 3, and the pore former 5 are contained in the catalyst layer forming material 1 used to form the lower catalyst layer 12L, whereas only the catalyst carrier 2 and the catalyst metal particles 3 but no pore former 5 are contained in the catalyst layer forming material 1 used to form the upper catalyst layer 12U.

Figure 4:
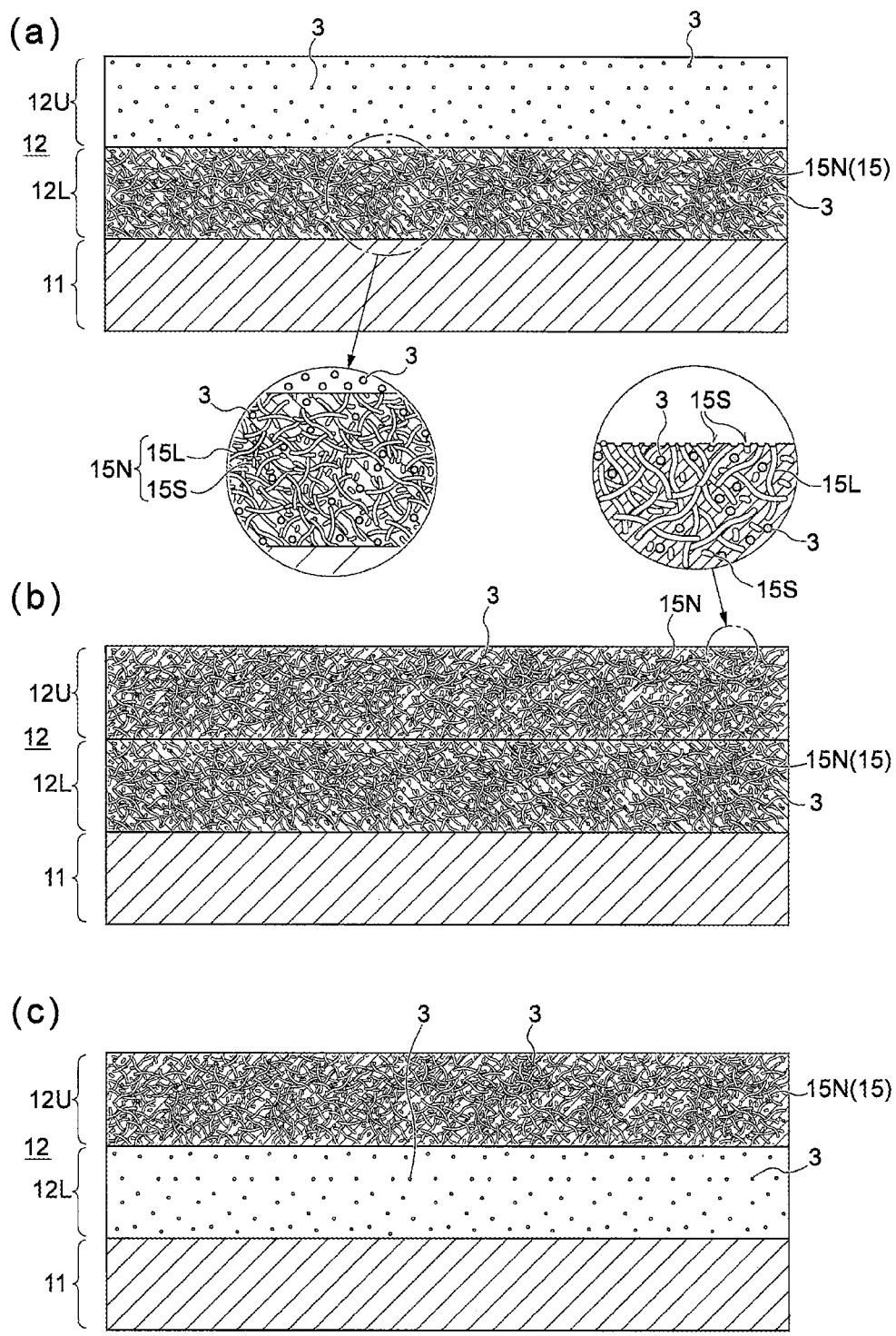
FIG. 4 is an enlarged cross-sectional view showing the catalyst apparatus constituent material according to the present invention.

The catalyst layer 12 is formed on opposite sides of the base 11, as shown in FIG. 1, and the catalyst layer 12 on one side (lower side) of the base 11 is omitted in FIG. 4. Further, the catalyst metal particles 3, long-dimension pores 15L, short-dimension pores 15S, the base 11, the upper catalyst layer 12U, and the lower catalyst layer 12L are drawn in FIGS. 1 and 4 at scales different from actual scales for convenience of the description.

Since the honeycomb structure 13 is incorporated in a casing 101, as will be described later, the approach shown below is employed in a case where the catalyst layer forming material 1 is not desired to be attached to the side circumferential surface of the honeycomb structure 13, which is the surface in contact with the casing 101.

Specifically, a tubular holder H, which has an inner diameter roughly equal to the outer diameter of the honeycomb structure 13, is used, and the honeycomb structure 13 is placed on a flange F formed at an inner lower portion of the holder H, as shown in FIG. 3(b).

On the other hand, an upper portion of the holder H spreads in the form of a funnel, and the catalyst layer forming material 1 is supplied through the funnel into the holder H via a liquid feeding tube S and applied onto the honeycomb inner wall surfaces of the honeycomb structure 13.

The catalyst layer forming material 1 discharged via a lower portion of the holder H is recovered and reused as appropriate.

(3) Baking

The honeycomb structure 13 is then heated and baked, for example, for one hour at 500° C., and the long fibers 5L and the short fibers 5S, which form the pore former 5 located in the catalyst layer 12 (the lower catalyst layer 12L in the embodiment), are evaporated to form the pores 15 (long-dimension pores 15L and short-dimension pores 15S) in the catalyst layer 12.

As shown in an enlarged view in FIG. 4(a), in the thus produced catalyst apparatus constituent material 10, the long-dimension pores 15L are in contact with each other or the long-dimension pores 15L adjacent to each other are connected to short-dimension pores 15S to form a pore network 15N, as if the pores 15 were connected to each other in the form of a network.

[Formation of Catalyst Apparatus]

The catalyst apparatus 100 is then formed by placing the catalyst apparatus constituent material 10 produced as described above in the tubular casing 101 made, for example, of metal, as shown in FIG. 1.

[Evaluation Test]

The catalyst apparatus 100 (sample 2) according to the present invention produced as described above was then attached to a compact motor cycle B and tested and evaluated, and results of the evaluation test (performance of cleaning CO, THC, and NOx (EU3: Fresh, Aging)) are shown below.

It is assumed that a sample 1, which is a target compared with the sample 2, includes the catalyst carrier 2 and the catalyst metal particles 3 in both the lower catalyst layer 12L and the upper catalyst layer 12U, but no pores 15.

Figure 5:
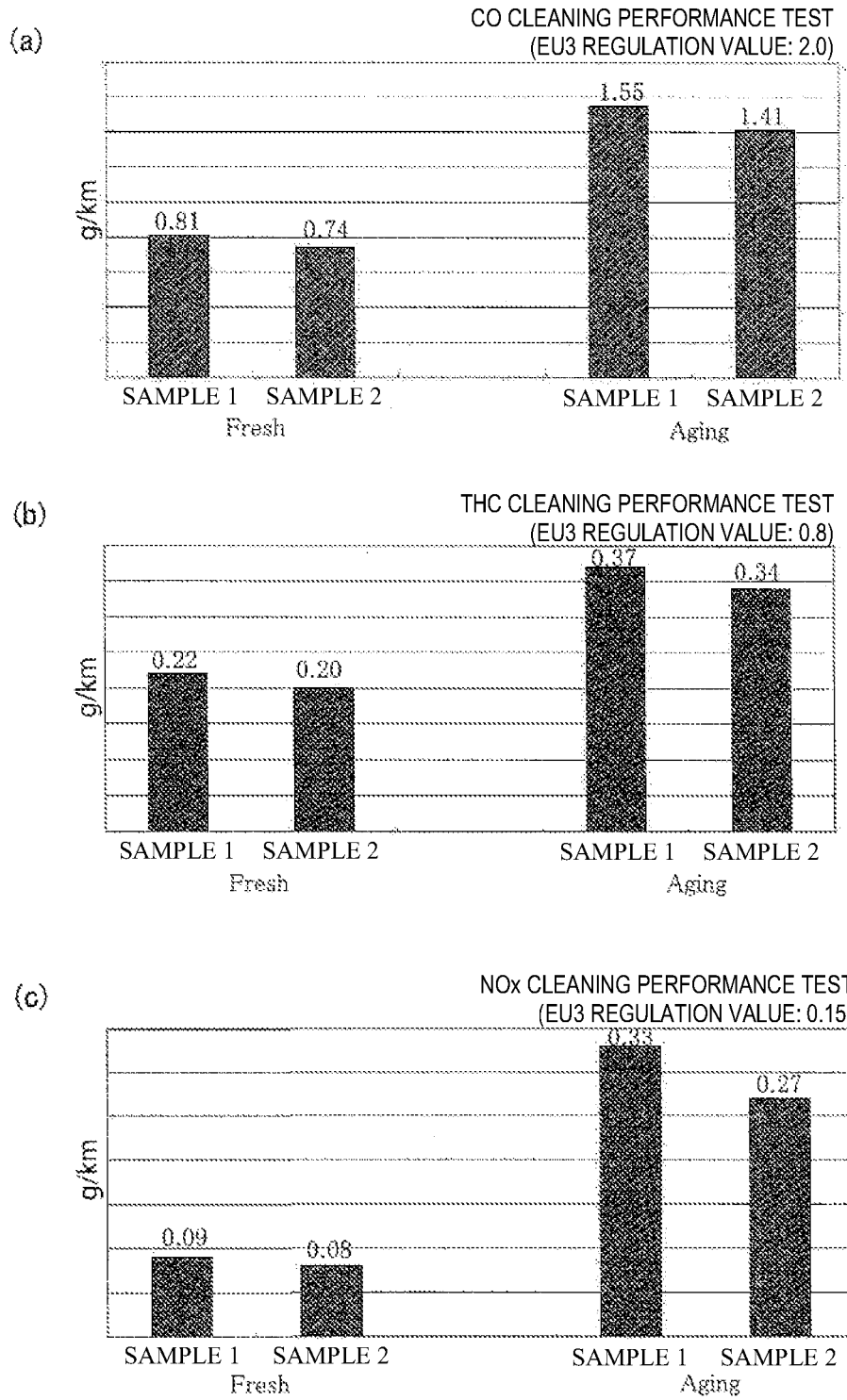
FIG. 5 shows graphs illustrating results of a test of cleaning performance of the catalyst apparatus according to the present invention.

The results demonstrate that the sample 2 has cleaning performance higher than that of the sample 1 for all the exhaust gas component, as shown in FIG. 5.

Other Embodiments

The present invention is embodied based on the embodiment described above and can also be embodied based on the following technical ideas of the present invention.

First, in the embodiment described above on which the other embodiments are based, the catalyst apparatus constituent material 10 has a tubular shape and can instead have an appropriate shape in accordance with the form and other factors of the catalyst apparatus 100, in which the catalyst apparatus constituent material 10 is incorporated.

For example, when the catalyst apparatus constituent material 10 is used as the electrode of a secondary battery, the catalyst apparatus constituent material 10 has a flat-plate-like shape.

In the embodiment described above on which the other embodiments are based, the honeycomb structure 13 is made of stainless steel. The honeycomb structure 13 may, however, be made of another material, such as ceramic. The honeycomb structure 13 can instead be produced by molding a ceramic material in extrusion molding to form a honeycomb structure and then baking the honeycomb structure as also shown in FIG. 1 by way of example.

In the embodiment described above on which the other embodiments are based, the pores 15 are formed only in the lower catalyst layer 12L formed on the base 11, and the upper catalyst layer 12U having no pores 15 formed therein is the catalyst-metal-particle-containing layer, as shown in FIG. 4(*a*). Instead, the pores 15 can be formed both in the lower catalyst layer 12L and the upper catalyst layer 12U, as shown in FIG. 4(*b*), or the pores 15 can be formed only in the upper catalyst layer 12U and the lower catalyst layer 12L having no pores 15 formed therein is the catalyst-metal-particle-containing layer, as shown in FIG. 4(*c*).

In the configuration shown in FIG. 4(*b*) described above, the pore networks 15N formed in the separate layers communicate with each other and are connected to each other.

In the configuration shown in FIGS. 4(*b*) and 4(*c*) described above, since the pores 15 are exposed at the surface layer of the upper catalyst layer 12U, which is the uppermost catalyst layer 12, the outside air (exhaust gas) is introduced to the entire pore network 15N, whereby the contact between the outside air (exhaust gas) and roughly all the catalyst metal particles 3 located in the catalyst layer 12 can be facilitated.

REFERENCE SIGNS LIST

1 Catalyst layer forming material
2 Catalyst carrier (slurry)
3 Catalyst metal particles
5 Pore former
5S Short fiber
5L Long fiber
10 Catalyst apparatus constituent material
11 Base
11*a* Corrugate base
11*b* Liner base
12 Catalyst layer
12L Lower catalyst layer
12U Upper catalyst layer
13 Honeycomb structure
15 Pores
15S Short-dimension pores
15L Long-dimension pores
15N Pore network
100 Catalyst apparatus
101 Casing
B Compact motorcycle
F Flange
H Holder
M Planetary ball mill
P Pot
S Liquid feeding tube
T Turntable
V Liquid tank
Z Zirconia ball

The invention claimed is:

1. A method for manufacturing a catalyst layer forming material, the method comprising mixing a catalyst carrier, which is slurry containing ceramic fine particles, with catalyst metal particles and a pore former to be evaporated at high temperature, wherein the pore former contains first fibers formed of cellulose nano-fibers and produced by mechanical defibration and second fibers formed of cellulose nano-fibers and produced by chemical defibration.

2. A method for manufacturing a catalyst apparatus constituent material, the method comprising applying the catalyst layer forming material manufactured by the method for manufacturing a catalyst layer forming material according to claim 1 onto a surface of a base, and baking the catalyst layer forming material to form a catalyst layer in which long dimension pores formed when the first fibers are evaporated come into contact with each other or long dimension pores adjacent to each other are connected to short dimension pores formed when the second fibers are evaporated to form a pore network in which the pores are connected to each other in the form of a network.

3. The method for manufacturing a catalyst apparatus constituent material according to claim 2, wherein the catalyst layer is formed of a plurality of catalyst layers.

4. The method for manufacturing a catalyst apparatus constituent material according to claim 2, wherein the base is a metal foil, and the base is formed in a corrugated shape and lapped and wound into a tubular shape having a honeycomb cross section.

5. The method for manufacturing a catalyst apparatus constituent material according to claim 2, wherein the base is a honeycomb structure made of ceramic.

6. A method for manufacturing a catalyst apparatus, the method comprising accommodating the catalyst apparatus constituent material manufactured by the method for manufacturing a catalyst apparatus constituent material according to claim 4 in a casing.

7. The method for manufacturing a catalyst apparatus constituent material according to claim 2, wherein the base is a metal foil, and the base is formed in a corrugated shape and lapped and wound into a tubular shape having a honeycomb cross section.

8. The method for manufacturing a catalyst apparatus constituent material according to claim 2, wherein the base is a honeycomb structure made of ceramic.

9. A method for manufacturing a catalyst apparatus, the method comprising accommodating the catalyst apparatus constituent material manufactured by the method for manufacturing a catalyst apparatus constituent material according to claim 5 in a casing.

10. The method for manufacturing a catalyst apparatus constituent material according to claim 1, wherein the second fibers are produced by TEMPO oxidizing defibration.

* * * * *